United States Patent
Maruyama et al.

[11] Patent Number: 6,072,149
[45] Date of Patent: Jun. 6, 2000

[54] LASER BEAM WELDING APPARATUS

[75] Inventors: Iwao Maruyama; Kazuhide Matsuo; Takanori Fujii, all of Kawagoe; Kenji Makihara, Sayama, all of Japan

[73] Assignee: Honda Giken Kogyo Kabushiki Kaisha, Tokyo, Japan

[21] Appl. No.: 09/018,892

[22] Filed: Feb. 5, 1998

[30] Foreign Application Priority Data

Feb. 5, 1997 [JP] Japan .................................. 9-022445

[51] Int. Cl.$^7$ .......................... B23K 26/20; B23K 26/22; B23K 26/24

[52] U.S. Cl. .............................. 219/121.63; 219/121.74; 219/121.77; 219/121.8; 219/121.83

[58] Field of Search .................. 219/121.63, 121.74, 219/121.76, 121.77, 121.79, 121.8, 121.83, 121.78

[56] References Cited

U.S. PATENT DOCUMENTS

| | | | |
|---|---|---|---|
| 4,654,505 | 3/1987 | Sciaky et al. | 219/121.63 |
| 4,728,773 | 3/1988 | Roberts et al. | |
| 4,812,613 | 3/1989 | Gorisch | 219/121.74 |
| 4,972,062 | 11/1990 | Aharon | 219/121.78 |
| 4,973,817 | 11/1990 | Kanno et al. | 219/121.63 |
| 5,115,115 | 5/1992 | Alborante | 219/121.63 |
| 5,237,151 | 8/1993 | Maruyama | 219/121.78 |
| 5,380,978 | 1/1995 | Pryor | 219/121.64 |
| 5,399,835 | 3/1995 | Nakata | 219/121.78 |
| 5,406,048 | 4/1995 | Yamazaki et al. | 219/121.78 |
| 5,616,261 | 4/1997 | Forrest | 219/121.63 |

FOREIGN PATENT DOCUMENTS

| | | |
|---|---|---|
| 0136190A1 | 4/1985 | European Pat. Off. . |
| 0241722A2 | 10/1987 | European Pat. Off. . |
| 0276664 | 8/1988 | European Pat. Off. . |
| 0440002A2 | 8/1991 | European Pat. Off. . |
| 4-36792 B2 | 6/1992 | Japan . |
| 4-220187 | 8/1992 | Japan . |
| 8-90266 | 4/1996 | Japan . |

*Primary Examiner*—Geoffrey S. Evans
*Attorney, Agent, or Firm*—Birch, Stewart, Kolasch & Birch, LLP

[57] ABSTRACT

After a workpiece introduced into a welding station by a feed mechanism is positioned and fixed in the welding station, the workpiece is welded by laser beams guided by scan heads. Each laser beam is applied from one of the scan heads to a location on the workpiece through a beam path switching mirror of a beam path switcher to weld the location on the workpiece. Thereafter, the beam path switching mirror is retracted to guide the laser beam from another one of the scan heads to another location on the workpiece to weld the other location on the workpiece.

8 Claims, 3 Drawing Sheets

LASER BEAM WELDING APPARATUS

BACKGROUND OF THE INVENTION

1. Field of the Invention

The present invention relates to a laser beam welding apparatus for welding a workpiece at a plurality of locations thereon efficiently with a laser beam.

1. Description of the Related Art

It has heretofore been customary to rely on resistance spot welding robots for welding inner and outer panels of automobile bodies. The resistance spot welding robots have a welding gun movable for successively welding various locations on an automobile body which has been loaded into a welding station.

Since the welding gun is relatively heavy, however, it takes a relatively long time to move the welding gun from one welding location to another on an automobile body, and therefore the welding gun cannot weld the automobile body efficiently. One solution to this problem is to use a plurality of resistance spot welding robots for welding an automobile body within a reduced period of time.

Using such plural resistance spot welding robots poses another drawback in that it results in increased investments in the welding facility and also in a welding line of increased length because of a large installation space required by the resistance spot welding robots. Because the welding gun of resistance spot welding robots has welding tips that are held in contact with a workpiece to be welded, it is necessary to take into account various adverse effects which the welding tips suffer, e.g., adhesion to the workpiece and wear of the welding tips. Specifically, the welding tips need to be monitored at all times, and when the welding tips adhere to the workpiece, the welding line have to be shut off, and suitable actions have to be taken to remove the welding tips from the workpiece. The welding tips should also be dressed periodically to keep themselves under conditions for optimum welding performance.

To eliminate the foregoing difficulties imposed by the resistance spot welding robots, it is been proposed to employ a welding robot for welding automobile bodies with a laser beam as disclosed in Japanese laid-open patent publication No. 4-220187. According to the disclosed welding robot, a laser beam application head mounted on the tip end of an arm of the welding robot is moved closely to a location to be welded on the automobile body and then welds the location on the automobile body. Inasmuch as the welding robot uses a laser beam, it is free of the problems of adhesion to the workpiece and wear of welding tips.

However, the laser beam application head cannot be moved at a high speed because it needs to be positioned in the vicinity of a desired location to be welded in a manner to coordinate with movement of the welding robot.

Japanese patent publication No. 4-36792 reveals a plurality of welding heads that can be positioned near a location to be welded on a workpiece. The angle of a plane mirror is adjusted to select a desired one of the welding heads, and the selected welding head is used to apply a laser beam to the location to be welded on the workpiece for thereby welding the workpiece at the location. The disclosed welding apparatus can weld the workpiece at a plurality of locations in a relatively short period of time.

One problem with the disclosed welding apparatus is that since the welding heads are fixed with respect to the workpiece, they cannot perform a seam welding process, which is a continuous welding process, though they can spot-weld the workpiece. Furthermore, because as many welding heads are required as the number of locations to be welded, the welding apparatus is expensive to manufacture. The positions and number of welding heads need to be changed depending on the type of workpieces to be welded, and such a changing process is tedious and time-consuming to carry out. In addition, the welding heads that are positioned closely to locations to be welded on a workpiece tend to be smeared by spatters produced when the welding heads weld the workpiece, resulting in a reduction in the accuracy with which the welding heads weld the workpiece.

SUMMARY OF THE INVENTION

It is an object of the present invention to provide a laser beam welding apparatus which is capable of welding a workpiece highly accurately and requires minimum investments in the welding facility and a minimum installation space.

Another object of the present invention is to provide a laser beam welding apparatus which is capable of moving a laser beam at a high speed with respect to a location to be welded on a workpiece for thereby welding the workpiece.

Still another object of the present invention is to provide a laser beam welding apparatus which can perform both a spot welding process and a seam welding process.

Yet still another object of the present invention is to provide a laser beam welding apparatus which can weld a workpiece continuously without suffering spatters that are produced when the workpiece is welded.

The above and other objects, features, and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
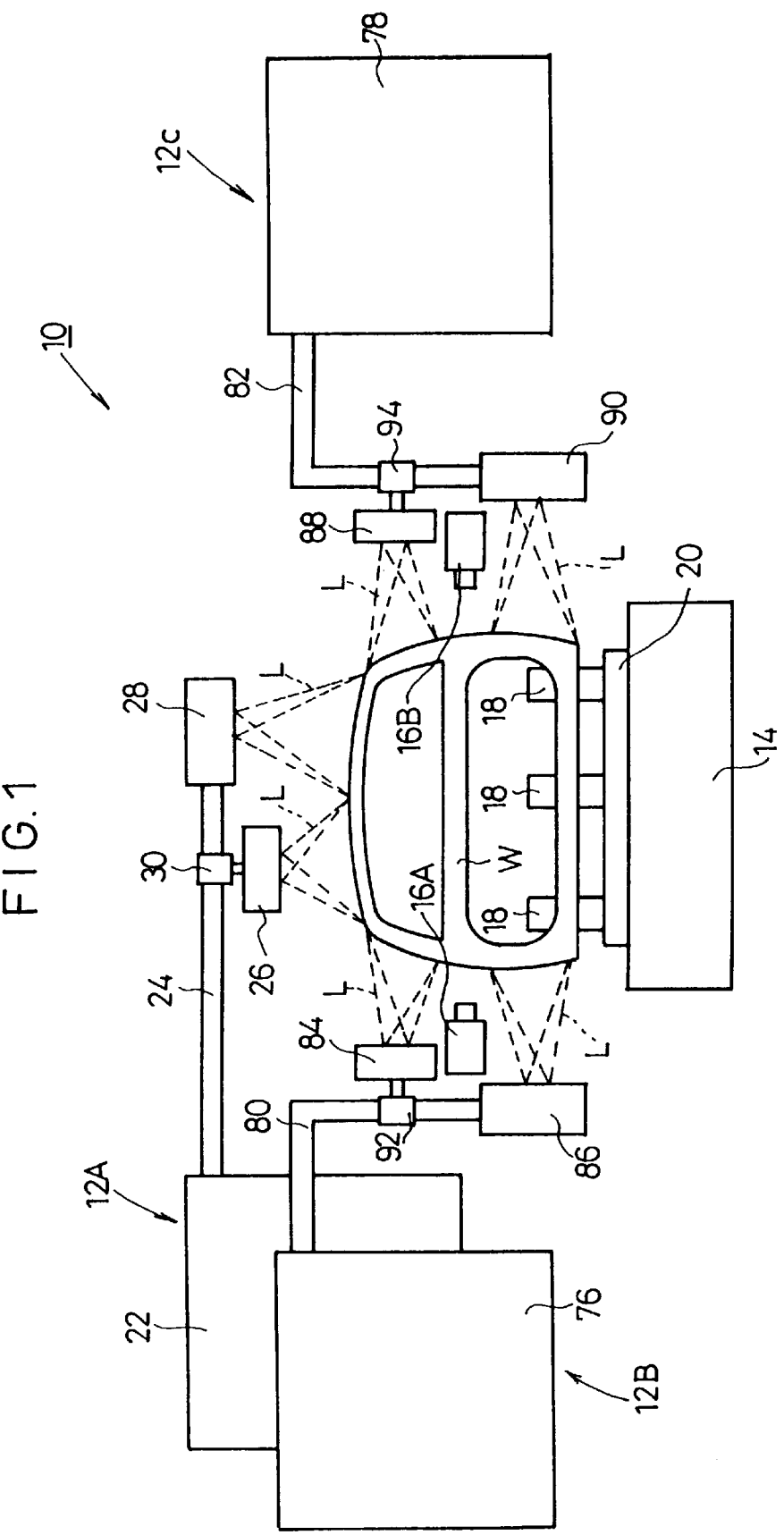
FIG. 1 is a front elevational view of a laser beam welding apparatus according to the present invention.
Figure 2:
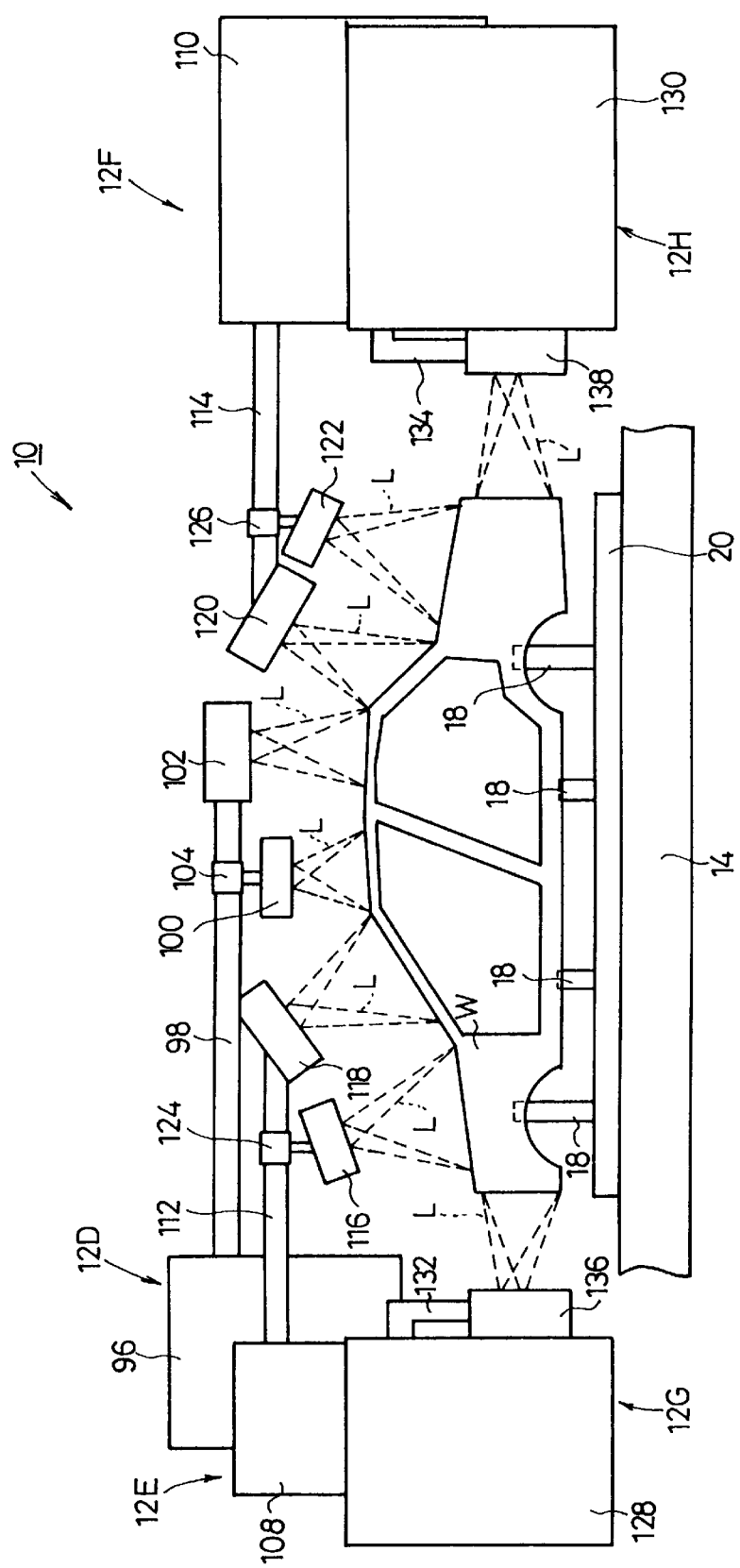
FIG. 2 is a side elevational view of the laser beam welding apparatus shown in FIG. 1.

As shown in FIGS. 1 and 2, a laser beam welding apparatus 10 according to the present invention comprises eight welding units 12A–12H disposed in a welding station, a feed mechanism 14 for feeding a workpiece W, which is an automobile body, to the welding station, and a pair of workpiece position measuring cameras 16A, 16B, which may be position measuring units such as CCD cameras or the like, disposed one on each side of the workpiece W, for measuring the position of the workpiece W introduced into the welding station. The workpiece W is introduced into the welding station by being carried on a carriage 20 and securely clamped thereon by a plurality of clamps 18. The welding unit 12A serves to weld a roof of the workpiece W transversely thereof W. The welding unit 12A comprises a laser oscillator 22 (laser beam emitting device) for emitting a beam L to be applied to the workpiece W at a location to be welded, a laser beam transmission passage 24 for providing beam paths for the laser beam L, two scan heads 26, 28 disposed in the laser beam transmission passage 24, and a beam path switcher 30 for changing beam passages for the laser beam L.

Figure 3:
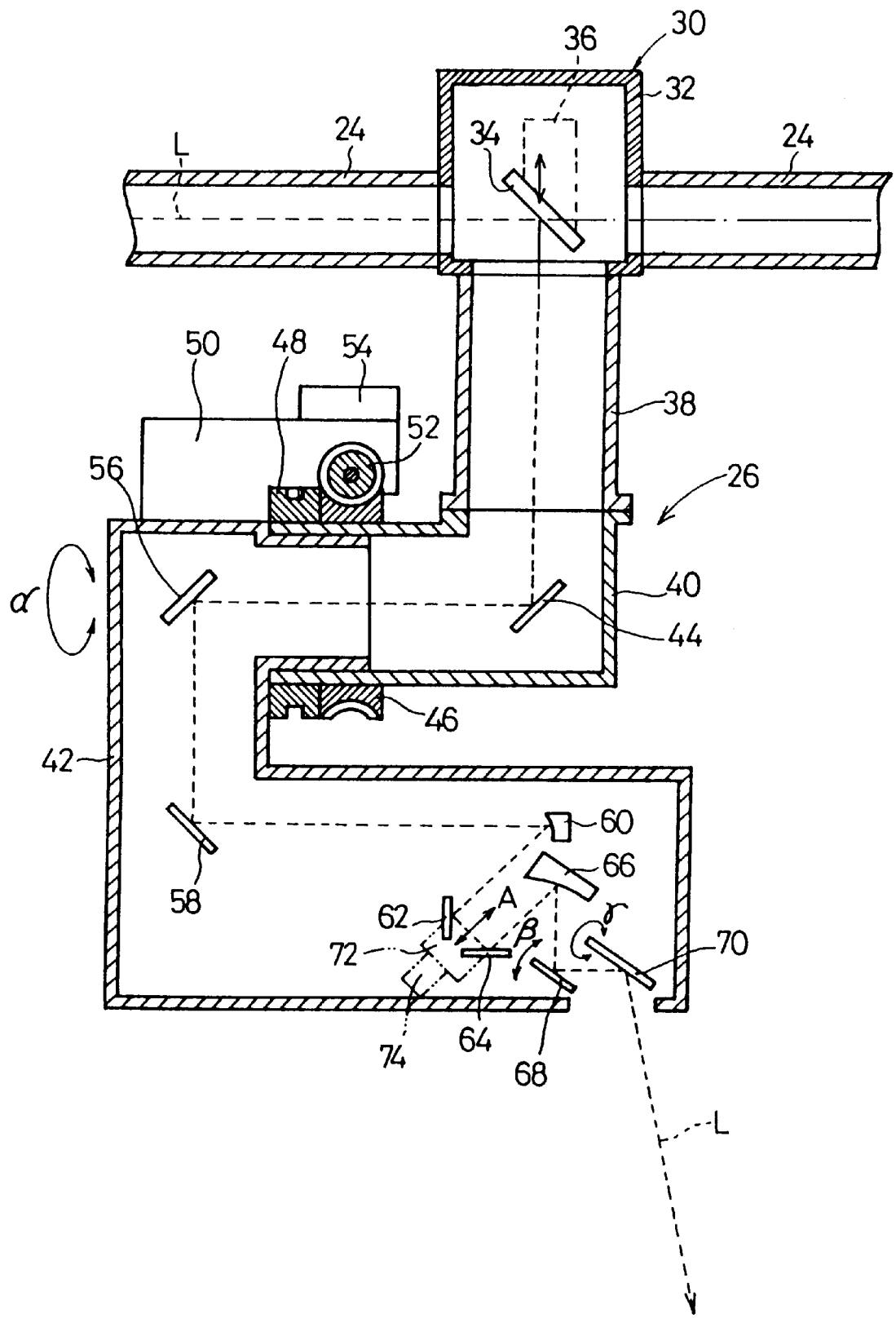
FIG. 3 is an enlarged vertical cross-sectional view of a scan head and a beam path switcher of the laser beam welding apparatus shown in FIG. 1.

The scan head 26 and the beam path switcher 30 are of a structure shown in FIG. 3. As shown in FIG. 3, the beam path switcher 30 has a casing 32 disposed in the laser beam transmission passage 24 and a beam path switching mirror 34 housed in the casing 32 for selectively reflecting the laser beam L into the scan head 26. The beam path switching mirror 34 is movable into and out of the laser beam transmission passage 24 in the directions indicated by the arrow by an actuating mechanism 36 such as a solenoid or the like. When the beam path switching mirror 34 is retracted out of the laser beam transmission passage 24 by the actuating mechanism 36, the laser beam L travels along the laser beam transmission passage 24 into the scan head 28. When the beam path switching mirror 34 is moved into the laser beam transmission passage 24 by the actuating mechanism 36, the beam path switching mirror 34 reflects the laser beam L into the scan head 26.

The scan head 26 has a casing 40 fixed to the beam path switcher 30 by a laser beam transmission passage 38 and a casing 42 coupled to the casing 40 by a turning mechanism which allows the casing 42 to turn in the directions indicated by the arrow α with respect to the casing 40. The casing 40 houses a reflecting mirror 44 therein. The turning mechanism comprises a worm wheel 46 and a rotation guide 48 which are fixedly disposed around an end of the casing 40 which is coupled to the casing 42. The worm wheel 46 is held in mesh with a worm 52 which is supported by a bracket 50 fixedly mounted on the casing 42. The worm 52 can be rotated by a stepping motor 54 mounted on the bracket 50, which is engaged by the rotation guide 48.

The casing 42 houses a pair of reflecting mirrors 56, 58 therein. The laser beam L which is reflected by the beam path switching mirror 34 through the laser beam transmission passage 38 into the casing 40 is reflected successively by the reflecting mirrors 44, 56, 58 to travel along a path which is defined in the casing 42 by a parabolic mirror 60 as a converging mirror, two reflecting mirrors 62, 64, an elliptical mirror 66, and two scanning mirrors 68, 70. The reflecting mirrors 62, 64 are supported by a frame 72 at a predetermined angle formed between the reflecting mirrors 62, 64. The frame 72 is movable back and forth in the directions indicated by the arrow A by a stepping motor 74 that is connected to the frame 72. The scanning mirrors 68, 70 can be deflected in respective different directions indicated by the arrows β, γ by servomotors (not shown).

As shown in FIG. 1, the welding units 12B, 12C serve to weld opposite side panels, respectively, of the workpiece W vertically. The welding units 12B, 12C have respective laser oscillators 76, 78 for emitting respective laser beams L, respective laser beam transmission passages 80, 82 for providing beam paths for the laser beams L, respective pairs of scan heads 84, 86 and 88, 90 disposed in the laser beam transmission passages 80, 82, respectively, and respective beam path switchers 92, 94 for changing beam passages for the laser beams L. As shown in FIG. 2, the welding unit 12D, which serves to weld the roof of the workpiece W longitudinally thereof, has a laser oscillator 96 for emitting a laser beam L, a laser beam transmission passage 98 for providing beam paths for the laser beam L, two scan heads 100, 102 disposed in the laser beam transmission passage 98, and a beam path switcher 104 for changing beam passages for the laser beam L. The welding units 12E, 12F serve to weld an engine hood, front and rear window frames, and a trunk lid of the workpiece W longitudinally thereof. The welding units 12E, 12F have respective laser oscillators 108, 110 for emitting respective laser beams L, respective laser beam transmission passages 112, 114 for providing beam paths for the laser beams L, respective pairs of scan heads 116, 118 and 120, 122 disposed in the laser beam transmission passages 112, 114, respectively, and respective beam path switchers 124, 126 for changing beam passages for the laser beams L. The welding units 12G, 12H serve to weld front and rear panels, respectively, of the workpiece W vertically. The welding units 12G, 12H have respective laser oscillators 128, 130 for emitting respective laser beams L, respective laser beam transmission passages 132, 134 providing beam paths for the laser beams L, and respective scan heads 136, 138 for deflecting the laser beams L. The scan heads 28, 84, 86, 88, 90, 100, 102, 116, 118, 120, 122, 136, 138 are identical in structure to the scan head 26, and the beam path switchers 92, 94, 204, 124, 126 are identical in structure to the beam path switcher 30. Therefore, the scan heads 28, 84, 86, 88, 90, 100, 102, 116, 118, 120, 122, 136, 138 and the beam path switchers 92, 94, 204, 124, 126 will not be described in detail below.

Operation of the laser beam welding apparatus 10 will be described below.

The workpiece W clamped on the carriage 20 by the clamps 18 is introduced into the welding station by the feed mechanism 14. The workpiece W positioned and fixed in the welding station is then imaged by the workpiece position measuring cameras 16A, 16B disposed one on each side of the workpiece W. the position of the workpiece W in the welding station is measured on the basis of image information of corners of a front window opening, corners of a rear window opening, and central pillar reference points of the workpiece W, which image information is captured by the workpiece position measuring cameras 16A, 16B. Any positional deviation or error of the workpiece W is calculated from the measured position of the workpiece W and predetermined positional information, and fed back to the scan heads 26, 28, 84, 86, 88, 90, 100, 102, 116, 118, 120, 122, 136, 138.

The scan heads 26, 28, 84, 86, 88, 90, 100, 102, 116, 118, 120, 122, 136, 138 then start welding the workpiece W according to teach data as corrected with respect to the positional deviation or error supplied thereto.

Specifically, as shown in FIG. 3, the stepping motor 54 of the scan head 26 of the welding unit 12A is energized to rotate the worm 52 meshing with the worm wheel 46, rotating the casing 42 in one of the directions indicated by the arrow α with respect to the casing 40. As a result, the scan head 26 is angularly positioned with respect to the roof of the workpiece W, and is ready to weld the roof of the workpiece W.

The laser beam L emitted from the laser oscillator 22 travels through the laser beam transmission passage 24 and is reflected by the beam path switching mirror 34 of the beam path switcher 30 into the scan head 26. In the scan head 26, the laser beam L is reflected by the reflecting mirrors 44, 56, 58, and reflected and converged by the parabolic mirror 60. The laser beam L is then reflected by the reflecting mirrors 62, 64 to the elliptical mirror 66, which converges the laser beam L. At this time, the reflecting mirrors 62, 64 are moved in the directions indicated by the arrow A based on corrective data for the positional deviation of the workpiece W. At the same time, the laser beam L is deflected by the scanning mirrors 68, 70 which are angularly moved in the directions indicated by the arrows β, γ by the non-illustrated servomotors, for thereby welding the workpiece W at a plurality of welding spots thereon based on the teach data.

When the welding process carried out by the scan head 26 is completed, the beam path switching mirror 34 is retracted out of the laser beam transmission passage 24 by the actuating mechanism 36. The laser beam L from the laser oscillator 22 now travels along the laser beam transmission passage 24 through the beam path switcher 30 into the scan head 28. The scan head 28 deflects the laser beam L to weld the roof of the workpiece W at a plurality of other welding spots thereon in the same manner as the scan head 26.

Since the workpiece W can be welded at a plurality of welding spots thereon simply by deflecting the laser beam L with the scan heads 26, 28, the time required to move the laser beam L with respect to those welding spots is greatly reduced. Furthermore, because the scan heads 26, 28 are selectively supplied with the laser beam L emitted from the common laser oscillator 22 simply by moving the beam path switching mirror 34 back and forth, the welding unit 12A takes up a relatively small installation space and can be manufactured relatively inexpensively. The scan heads 26, 28 with the optical elements housed therein can be spaced widely apart from the workpiece W, the scan heads 26, 28 do not suffer spatters that are produced when the workpiece W is welded and hence can weld the workpiece W under good welding conditions. In addition, inasmuch as the laser beam L is used to weld the workpiece W, the scan heads 26, 28 are free of the problems of adhesion of welding tips to the workpiece W and wear of welding tips which would otherwise take place with the resistance spot welding apparatus, and do not require a maintenance procedure such as for welding tip dressing. The scan heads 26, 28 can thus weld the workpiece W highly efficiently.

The other welding units 12B–12H weld the workpiece W in the same manner as the welding unit 12A.

As described above, each of the scan heads 12A–12H, once it has angularly been adjusted with respect to the workpiece W, is not required to be moved in its entirety during a welding process, and only the scanning mirrors 68, 70 and the focus or optical-path-length adjusting mirrors 62, 64 in the scan head are controlled to weld the workpiece W quickly and efficiently over a welding area which may be of a size of about 800 mm×800 mm. Because each scan head is selectively supplied with the laser beam L emitted from the common laser oscillator, the welding unit takes up a relatively small installation space and can be manufactured relatively inexpensively.

Moreover, inasmuch as the laser beam L is used to weld the workpiece W, each of the scan heads is free of the problems of adhesion of welding tips to the workpiece W and wear of welding tips which would otherwise take place with the resistance spot welding apparatus. Since a pair of scan heads is capable of welding the workpiece at a plurality of areas thereon, the number of scan heads that need to be equipped in the welding station is minimized. Consequently, investments in the welding facility and an installation space required by such scan heads are also minimized, and the process of teaching the scan heads beforehand is simplified. Each of the scan heads, which comprises a beam deflecting optical system and a beam converging optical system, can apply a laser beam from a position spaced widely apart from the workpiece, and hence is free from spatters which are produced when the workpiece is welded.

Although a certain preferred embodiment of the present invention has been shown and described in detail, it should be understood that various changes and modifications may be made therein without departing from the scope of the appended claims.

What is claimed is:

1. A laser beam welding apparatus comprising:
    a laser beam emitting device for emitting a laser beam to be applied to a location to be welded on a workpiece in a welding station;
    a plurality of scan heads for guiding the laser beam to said location to be welded on the workpiece; and
    a beam path switcher disposed in a laser beam transmission passage between said laser beam emitting device and said scan heads, for guiding the laser beam to a selected one of said scan heads;
    wherein each of said scan heads comprises a beam deflecting optical system for guiding the laser beam to said location to be welded on the workpiece and a beam converging optical system for converging the laser beam onto said location to be welded on the workpiece, said beam deflecting optical system further comprising an angularly movable scanning mirror disposed downstream from said converging optical system for deflecting said laser beam, said scanning mirror being angularly movable with respect to said converging optical system for deflecting said laser beam to a plurality of welding spots on the workpiece.

2. A laser beam welding apparatus according to claim 1, wherein said beam path switcher comprises a beam path switching mirror movable into and out of said laser beam transmission passage, for guiding the laser beam to the selected one of said scan heads.

3. A laser beam welding apparatus according to claim 1, wherein said beam deflecting optical system comprises a plurality of scanning mirrors for deflecting the laser beam.

4. A laser beam welding apparatus according to claim 3, wherein said plurality of scanning mirrors comprise two scanning mirrors angularly movable in respective different directions.

5. A laser beam welding apparatus according to claim 1, wherein said beam converging optical system comprises a pair of reflecting mirrors for adjusting the length of a beam path for the laser beam and a pair of converging mirrors for converging the laser beam.

6. A laser beam welding apparatus according to claim 1, wherein each of said scan heads comprises a casing which houses said beam deflecting optical system and said beam converging optical system therein, and a turning mechanism for turning said casing about an axis.

7. A laser beam welding apparatus according to claim 1, further comprising a feed mechanism for introducing the workpiece into the welding station, and a position measuring device disposed in said welding station, for measuring the position of the workpiece in the welding station, the arrangement being such that a position in which the workpiece is scanned by the laser beam guided by each of said scan heads is corrected out of a deviation based on a positional deviation of said workpiece which is measured by said position measuring device.

8. A laser beam welding apparatus according to claim 7, wherein said position measuring device comprises a pair of cameras for measuring said positional deviation of said workpiece with respect to a reference point on the workpiece according to image information captured thereby.

* * * * *